United States Patent [19]

Burkhart et al.

[11] Patent Number: 4,837,244

[45] Date of Patent: Jun. 6, 1989

[54] METHOD FOR THE PREPARATION OF POLYURETHANE FOAMS

[75] Inventors: Georg Burkhart, Essen; Volker Möring, Muelheim; Dietmar Schaefer, Essen, all of Fed. Rep. of Germany

[73] Assignee: Th. Goldschmidt AG, Essen, Fed. Rep. of Germany

[21] Appl. No.: 217,427

[22] Filed: Jul. 11, 1988

[30] Foreign Application Priority Data

Jul. 25, 1987 [DE] Fed. Rep. of Germany ....... 3724716

[51] Int. Cl.$^4$ .............................................. C08G 18/14
[52] U.S. Cl. .................................... 521/114; 521/116; 521/137
[58] Field of Search ..................... 521/114, 116, 137

[56] References Cited

PUBLICATIONS

Kunststoff–Handbuch–Polyurethane, pp. 504–544.
Pur–Hartschaumstoffe, pp. 246–331.

*Primary Examiner*—Maurice J. Welsh
*Attorney, Agent, or Firm*—Toren, McGeady & Associates

[57] ABSTRACT

A method for the preparation of rigid polyurethane and/or polyisocyanurate foams is disclosed. The foams are prepared from a mixture comprising at least difunctional polyisocyanates, compounds with at least two hydrogen atoms that are capable of reacting with isocyanates, the equivalent weight of which per reactive hydrogen atom is about 50 to 900, catalysts, blowing agents and foam stabilizers, devoid of silicon atoms, as well as, optionally, conventional additives such as flame retardants and chain extenders. The foam stabilizer is a polyoxyalkylene ether of an alkylphenol-aldehyde condensation product, the alkyl group(s) of the alkylphenol having 1 to 22 carbon atoms, the aldehyde having 1 to 18 carbon atoms, the condensation product comprising on the average 4 to 18 alkylphenol groups, the oxyalkylene units having 2 to 4 carbon atoms and the content of oxyalkylene groups being 15 to 85% by weight, based on the total weight.

8 Claims, No Drawings

METHOD FOR THE PREPARATION OF POLYURETHANE FOAMS

FIELD OF INVENTION

The invention is directed to a method for the preparation of rigid polyurethane and/or polyisocyanurate foams from (1) at least difunctional polyisocyanates, (2) compounds with at least two hydrogen atoms that are capable of reacting with isocyanates, the equivalent weight of which per reactive hydrogen atom is about 50 to 900, (3) catalysts, (4) blowing agents and (5) foam stabilizers devoid of silicon atoms, as well as, optionally, conventional additives such as flame retardants and chain extenders.

BACKGROUND INFORMATION AND PRIOR ART

Polyurethane foams are produced in large amounts by known methods and from known raw materials. A comprehensive presentation of the raw materials used and the applicable methods may be found in Ullmann's "Enzyklopädie der technischen Chemie" (Encyclopedia of Chemical Engineering), 1980, volume 19, pages 301 to 341, and in the Kunststoff-Handbuch (Plastics Handbook), volume VII, "Polyurethanes" by R. Vieweg and A. Höchtlen, Carl Hanser Verlag, Munich, 1966, pages 504 to 544, as well as in "Polyurethane" Kunststoff-Handbuch ("Polyurethanes" Plastics Handbook) 7 by G. Oertel, Carl Hanser Verlag, Munich, 1983, pages 246 to 331.

Polyurethane foams are preferably used for thermal insulation. For this application, they can be foamed into molded articles such as panels. It is also possible to fill hollow spaces of all types with foam, in which case the foam in the hollow space, as a structural element, frequently must also have load-bearing properties. It is furthermore possible to spray rigid polyurethane foams on tabular supports.

The quality and the properties of the rigid foam formed depend to a large extent on the structure and chemical composition of the foam stabilizer used.

As foam stabilizer, polysiloxane-polyoxyalkylene block copolymers are generally used. These stabilizers have a high effectiveness and can be adapted to the foaming system and the foaming method by selecting a suitable structure and composition. However, a disadvantage of these organosilicon stabilizers is their high prices. It has also been observed that the surfaces of the foamed material obtained by using organosilicon stabilizers are difficult to wet. As a result, subsequent protective treatments for the surfaces, such as painting or varnishing, become difficult. Attempts have therefore already been made to develop silicon-free stabilizers, which do not have these disadvantages.

German Pat. No. 2,244,350 describes a method for the preparation of a polyurethane foam by the reaction of a polyisocyanate having at least 2 NCO groups, with a polyether polyol in the presence of a catalyst, a blowing agent and 0.5 to 3 parts by weight, based on 100 parts by weight of polyether polyol, of a polymer as cell stabilizer. The latter is polymerized by a free radical mechanism in an alcohol and contains incorporated N-vinylpyrrolidone. According to the patent, the entire liquid product obtained by polymerizing the following monomers is used as cell stabilizer:

(a) 5 to 60% by weight of N-vinylpyrrolidone,
(b) 12.7 to 26.5% by weight of N-vinylpyrrolidone and 14.5 to 38.4% by weight of dibutyl maleate or
(c) 10 to 19% by weight of N-vinylpyrrolidone, 20 to 25% by weight of dibutyl maleate and 8 to 16% by weight of vinyl acetate The polymerization may optionally be carried out in the presence of a chain transfer agent. The polymerization is initiated with a free radical and is carried out in a liquid polyether polyol with 2 to 8 hydroxyl groups and a molecular weight of 150 to 650. The polymerization proceeds so that at least 30% of the monomers are polymerized. In the patent, it is presumed that the polymerized product is the cell-stabilizing component. However, if the polymer is separated from the polyol, it is less effective and does not regain its effectiveness if it is redissolved in the polyol.

Similar stabilizers are described in U.S. Pat. No. 3,914,188. The copolymer, which is effective as stabilizer, is synthesized by the copolymerization, in a polyether with capped end groups, of compounds of the formula

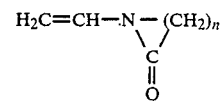

in which n=3, 4 or 5 and the ester of an unsaturated dicarboxylic acid with 4 or 5 carbon atoms. These stabilizing preparations have the advantage that they are largely inert towards isocyanates. Mixtures of these stabilizers with isocyanates can thus be produced, which have a long shelf life.

In the paper "Organic Surfactants for Rigid Urethane and Isocyanurate Foam" by M.J. Skowronski and M.E. Londigran in the Journal of Cellular Plastics 22, 1986, 235 ff., organic stabilizers are described for phenolic resin, isocyanurate and urethane foams. Particularly polymers of fumarate diesters, especially ditridecyl fumarate, are indicated to be useful. The polymerization of these esters was carried out in castor oil, which had been reacted with 36 moles of ethylene oxide in an addition reaction, the polymer having been left in the castor oil.

These known silicon-free stabilizers make it possible to produce rigid polyurethane foams, the surfaces of which can be wetted, painted and glued more satisfactorily. At the same time, the burning behavior of the rigid polyurethane foams is improved. They are, however, not able to fulfill all the required conditions. An important disadvantage of these silicon-free stabilizers as compared to organosilicon stabilizers lies in the reduced solubility of the halocarbon-based blowing agent in the foam system. This reduced solubility is observed especially when polyesterols are used. This is the cause of the inferior thermal insulation effects of the foamed materials, which has been observed in these cases.

OBJECT OF THE INVENTION

It is therefore a primary object of the present invention to provide silicon-free foam stabilizers, which enable the production of polyurethane foams with improved burning behavior and advantageous surface properties, which, moreover, exhibit outstanding thermal insulation effects. Such foam stabilizers should therefore increase the solubility of halocarbon blowing agents in the foaming formulation. At the same time, the foam stabilizers should be inert towards isocyanate groups, whenever it is desired to prepare premixtures with the starting compounds of the foaming reaction having a long shelf life.

Another object of the invention is to provide a method for producing rigid polyurethane and polyisocyanurate foams, which have the above properties, with foam stabilizers devoid of silicon.

Generally, it is an object of the invention to improve on the art of foam production.

SUMMARY OF THE INVENTION

Surprisingly, it has been ascertained that the above objects are superiorly achieved by using foam stabilizers which are polyoxyalkylene ethers of alkylphenol-aldehyde condensation products, wherein the alkyl group(s) of the alkylphenols have 1 to 22 carbon atoms while the aldehyde has 1 to 18 carbon atoms. The condensation product comprises, on the average, 4 to 18 alkylphenol groups, while the oxyalkylene units have 2 to 4 carbon atoms and the oxyalkylene group content is 15 to 85% by weight, based on the total weight.

Preferably, polyoxyalkylene ethers of alkylphenol-aldehyde condensation products are used, in which the alkyl group of the alkylphenols has 8 to 12 carbon atoms, the aldehyde has 1 to 4 carbon atoms, while the condensation product comprises, on the average, 4 to 10 alkylphenol groups. The oxyalkylene units have preferably 2 or 3 carbon atoms and the oxyalkylene group content is 35 to 65% by weight, based on the total weight.

Especially preferred are the polyoxyethylene ethers of the alkylphenolformaldehyde condensation products.

Examples of suitable alkylphenols are cresol, ethyl-, propyl-, butyl-, amyl-, phenyl-, 1-phenylethyl-, octyl-, nonyl-, dodecyl-, tetradecyl-, octadecyl-, eicosanyl- or docosanylphenol or mixtures thereof, as well as crude alkylphenols, which still contain a certain amount of dialkylphenols due to the way in which they were produced. Preferred alkylphenols are octyl-, nonyl-, and dodecylphenol.

Examples of suitable aldehydes are formaldehyde, acetaldehyde, propionaldehyde, glyoxal, butyraldehyde, glutaraldehyde, valeraldehyde, capronaldehyde, 2-ethylhexanol, benzaldehyde, tolualdehyde, phenylacetaldehyde, chloral, caprinaldehyde, laurinaldehyde or octadecanal or mixtures thereof.

The condensation is preferably carried out with formaldehyde.

As alkylene oxides, ethylene oxide, propylene oxide and butylene oxide come into consideration. Ethylene oxide and propylene oxide are preferred. If polyoxyalkylene ethers with different oxyalkylene units are used, these units may be arranged in blocks or distributed randomly.

In one embodiment of the invention, polyoxyalkylene ethers of alkylphenol-aldehyde condensation products are used, in which the terminal OH groups of the polyoxyalkylene groups, or a portion of these OH groups, are replaced by groups inert towards isocyanate groups. In this case, especially those products are used, in which the polyoxyalkylene groups have terminal $OR^1$ groups and $R^1$ is an alkyl group with 1 to 8 carbon atoms, a carbamoyl group or an acyl group.

Examples of suitable $R^1$ alkyl groups are the methyl, ethyl, propyl, butyl, pentyl, hexyl, heptyl, octyl, allyl or benzyl group.

The $R^2$ group of the carbamoyl

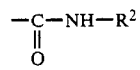

group and the acyl

group is a hydrocarbon with 1 to 8 carbon atoms. These inert groups can be produced by reaction of the OH groups with alkyl halides, such as methyl-, ethyl-, propyl-, butyl-, allyl- or benzyl halides or by reaction with olefinic compounds such as isobutene or alkyl vinyl ether. Further, the inert groups can be produced by the reaction of said OH groups with organic isocyanates such as methyl-, ethyl-, butyl- or phenyl isocyanate or with carboxylic acids or their derivatives, such as acetic acid, acetic anhydride, acetyl chloride, alkyl acetate, benzoic acid or benzoyl chloride.

By selecting a suitable inert group, it is possible to obtain products, which are stable in the polyisocyanate and thus may be stored. However, if the stabilizers are to be mixed with the polyol to be foamed, those products are preferred, in which at least half the $R^1$ groups are hydrogen. As the content of hydroxyl groups increases, the solubility of the compounds in the polyols to be foamed increases, so that these compounds can be mixed in an improved manner and metered out more readily.

The alkylphenol resins, selected pursuant to the invention, are known compounds and can also be synthesized by methods, which are known and are similar to those used for the corresponding unsubstituted phenolic resins, namely by condensation of phenol and aldehyde components under acidic or basic conditions of catalysis. A comprehensive presentation of the applicable methods may be found, for example, in "Ullmanns Enzyklopädie der technischen Chemie" (Ullmann's Encyclopedia of Chemical Engineering), 4th edition, 1979, vol. 18, pages 245 to 257, Verlag Chemie, Weinheim, in the "Encyclopedia of Polymer Science and Technology", vol. 10, 1969, pages 1 to 73, Interscience Publishers, New York, and in "Methoden der organischen Chemie (Houben-Weyl)" (Methods of Organic Chemistry (Houben-Weyl)), vol. 14/2, 1963, pages 193 to 292, Verlag Georg Thieme, Stuttgart.

The alkylphenol resins to be used are preferably synthesized under acid catalysis conditions. The subsequent alkoxylation of the alkylphenol resins is also carried out by known methods, preferably in the presence of basic catalysts.

In the German Offenlegungsschrift No. 2,647,390, a method is described for the preparation of foamed phenolic resins with a density between 0.03 and 0.40. This is done from a mixture, which contains at least one phenolic resin of the resol type, a blowing agent, a surface active agent and an acidic curing agent. This method is characterized by using, as surface active agent, a novolak with at least 5 alkylphenol nuclei, the alkyl groups of which have 8 to 12 carbon atoms and which carry alkylene oxide chains. These chains are built up from ethylene oxide and propylene oxide units in the ratio of at least 10 molecules of alkylene oxide per alkylphenol nucleus. This surface active agent is used in an amount of 0.5 to 5% based on the phenolic resin used. Those skilled in the art could not infer from this teaching a usefulness of these products for the stabilization of polyurethane foams, since the effect of stabilizers is specific to the substrate.

The stabilizers to be used pursuant to the invention, are employed in the usual amounts, that is, in amounts of about 0.2 to 5% by weight, based on the polyol.

It is, of course, possible to use additional stabilizers which may have other structures or other additives, in addition to the stabilizers of the invention.

As polyisocyanates and as compounds with hydrogen atoms capable of reacting with isocyanates, the usual compounds, known for this purpose from the art, can be employed. Suitable polyisocyanates comprise the known aliphatic, cycloaliphatic, araliphatic, as well as aromatic diisocyanates or polyisocyanates. The preferred polyisocyanates are 2,4- and 2,6-toluene diisocyanate, diphenylmethane diisocyanate, polymethylenepolyphenyl isocyanate and mixtures thereof. Any of the other polyisocyanates normally used, such as hexamethylene diisocyanate, chlorophenyl diisocyanate, bromophenyl diisocyanate, tetraisocyanatodiphenylmethane or the like may also be used.

Compounds with at least two hydrogen atoms, capable of reacting with isocyanate groups, are understood to be compounds which have hydroxyl groups and/or amino groups and/or thiol groups and/or carboxyl groups; preferably, however, they are compounds which have hydroxyl and/or amino groups. As a rule, these compounds have 2 to 8 and preferably 2 to 4 hydrogen atoms, which are capable of reacting with isocyanates. Examples of such compounds are familiar to the foaming expert and may be found, for example, in the German Offenlegungsschrift No. 2,832,253.

By means of the method of the invention, rigid polyurethane and/or polyisocyanurate foams are obtained, which have the following desired combination of properties: reduced flammability, improved paintability and gluing properties of the foam surface, high thermal insulation effects and an advantageous price to effectiveness ratio of the foam stabilizers. In the following examples, the synthesis of the stabilizers, their use in the production of polyurethane foams and the application properties of the foams obtained are explained in greater detail, it being understood that these examples are given by way of illustration and not by way of limitation.

EXAMPLE 1

Synthesis of a Foam Stabilizer

Paraformaldehyde (30 g, 1 mole) in 100 mL of toluene is added to a 3-neck flask, which is equipped with stirrer, dropping funnel and water separator, and heated to 80° C. Within 30 minutes, a mixture of 220 g (1 mole) of nonylphenol, 50 mL of toluene and 5.1 g of dodecylbenzenesulfonic acid is metered in at a temperature of about 90° C. The water of reaction is distilled of azeotropically. This distillation is followed by a post-reaction period of 30 minutes at 120° C. After the addition of 5.2 g of potassium hydroxide, the water of reaction is removed azeotropically.

For the determination of the alkylphenol resin content of the solution (% by weight), a samples is taken and the solvent distilled off from it under reduced pressure.

The alkaline alkylphenol/toluene solution is transferred to a reactor with a circulation system.

After flushing with nitrogen, the temperature is raised to 110° C. Then, over a period of an hour, 235 g (5.3 moles) of ethylene oxide are added at such a rate, that a temperature of 120° C. and a pressure of 10 bar are not exceeded. Finally, heating is continued at 120° C. until the pressure remains constant (approx. 4 hours).

After that, the product is neutralized with phosphoric acid, water and solvent are distilled off and the salt formed is removed by filtration.

The product, the oxyalkylene portion of which is about 50% by weight, has a most frequent molecular weight of about 5,000, as determined by gel chromatography.

The foam stabilizers, listed in the following, are prepared as described above and differ as follows:

Foam stabilizer:
A: Product as described above.
B: Ethylene oxide (100 g, 2.3 moles) is added, so that a product with about 30% by weight of oxyalkylene moiety is formed (most frequent molecular weight: about 4,000)
C: Ethylene oxide (548 g, 12.5 moles) is added so that a product with about 70% by weight of oxyalkylene moiety is formed (most frequent molecular weight: about 6,000)
D: A mixture of 262 g (1 mole) of dodecylphenol, 50 mL of toluene and 5.1 g of dodecylbenzenesulfonate is metered into the paraformaldehyde solution.
E: Paraldehyde (44 g, 1 mole) in 100 mL of toluene is added.
F: Initially, 90 g (1.5 moles) of propylene oxide is added. When this has been consumed, 260 g (5.9 moles) of ethylene oxide is added, so that a product with about 60% by weight of oxyalkylene moiety is formed.
G: Initially, 73 g (1 mole) of butylene oxide is added. After this has been consumed, 360 g (8.2 moles) of ethylene oxide is added, so that a product with about 60% by weight of oxyalkylene material is formed.
H: The product of Example 1 is subsequently reacted with an amount of phenyl isocyanate, which is equimolar with the OH groups.
I: The product of Example 1 is subsequently reacted with an amount of butyl isocyanate, which is equimolar with the OH groups.

Two silicon-free foam stabilizers are used for comparison.

Comparison Product 1:

A polymer product, containing a copolymer of N-vinylpyrrolidone and dibutyl maleate, polymerized in a trifunctional polyol, which is described in U.S. Pat. 3,746,663.

Comparison Product 2:

A polymer of tridecyl fumarate, polymerized in ethoxylated castor oil, described in U.S. Pat. 4,529,745.

EXAMPLES 2 TO 12

Preparation of Polyurethane Foams

Rigid polyurethane foams are produced by a manual foaming process using the following formulation, which is suitable for the continuous production of rigid polyurethane foam panels on double belt installations (CLBS) (the data is given in parts by weight):

70 parts of a polyester polyol with a hydroxyl number of 350

30 parts of an amine polyether polyol with a hydroxyl number of 530

10 parts of tris-2-chloropropyl phosphate flame retardant
0.5 parts of water
1.0 parts of N,N-dimethylcyclohexylamine
2.0 parts of trimethyl-2-hydroxypropylammonium formate
0.75 parts of foam stabilizer
35.0 parts of trichlorofluoromethane
262.7 parts of crude diphenylmethane diisocyanate, MDI (index 250)

All components, other than the diisocyanate, are stirred for 30 seconds at 1,000 rpm and 23° C. The diisocyanate is then added and stirring is continued for a further 7 seconds at 2,500 rpm. Within 5 seconds, the mixture is added to a wooden mold with a cavity of 40×40×5 cm (degree of overfilling: approximately 5%). The mold is then closed immediately. Aluminum paper is used to line the mold. Before it is removed, the foam is allowed to cure for about 20 minutes in the unheated mold. The core density of the foam obtained by this method is about 45 kg/m³ (without the outer skin).

The samples, required for the particular physical measurements (without outer skin), are cut from the molded foam object with a foam saw. The physical measurements are carried out at 23° C. and 50% relative humidity. The values, listed in Table 1, are obtained by the following methods:

(a) Determination of the flammability by the "lowest oxygen index" method (LOI) of ASTM D 2863/70. The higher the LOI, the lower is the flammability of the foam.
(b) Determination of coefficient of thermal conductivity λ by the method of DIN 52612 (Anacon instrument, model 88, sample size: 20×20×2.5 cm).
(c) Determination of the closed cell nature with the air comparison pycnometer, model 930, from Beckmann using the Beckmann method (sample diameter: 3.4 cm; height: 4 cm).

The application properties of the foams obtained are given in Table 1 as a function of the stabilizer used.

TABLE 1

| Example | Foam Stabilizer | Cell Structure | LOI Value | λ [W/m/K] | Closed Cells [%] |
|---|---|---|---|---|---|
| 2 | A | very fine to fine | 23.3 | 0.0204 | 92.5 |
| 3 | B | very fine | 23.2 | 0.0201 | 94.3 |
| 4 | C | very fine | 23.2 | 0.0203 | 93.6 |
| 5 | D | very fine | 23.1 | 0.0204 | 92.7 |
| 6 | E | very fine to fine | 23.3 | 0.0208 | 91.8 |
| 7 | F | very fine to fine | 23.1 | 0.0202 | 93.7 |
| 8 | G | very fine to fine | 23.0 | 0.0202 | 94.1 |
| 9 | H | very fine to fine | 23.2 | 0.0211 | 90.9 |
| 10 | I | very fine to fine | 23.1 | 0.0203 | 93.4 |
| 11 | Comparison 1 | very fine to fine | 23.0 | 0.0212 | 90.8 |
| 12 | Comparison 2 | very fine to fine | 23.0 | 0.0211 | 91.3 |

The foams produced by the method of the invention show excellent cell structure with a very high proportion of closed cells; moreover, they exhibit an advantageous burning behavior and provide outstanding thermal insulation (low thermal conductivity).

EXAMPLES 13 TO 23

Solubility of the Foam Components

In these examples, the effect of the different foam stabilizers used in Examples 2 to 12 on the solubility of the individual components, especially of the halocarbon blowing agents, in the foaming formulation is demonstrated.

With the exception of the blowing agent and the isocyanate component, all the components listed in the formulation described above are premixed in the parts by weight given. After this mixture is transferred to a glass bottle, 30 parts by weight of trichlorofluoromethane is added, the bottle is closed carefully and the contents mixed intensively by shaking. After the gas bubbles have risen, the homogeneity of the mixture is evaluated visually. The results are given in Table 2 (see Example 1 for identity of the foam stabilizers)

TABLE 2

| Example | Foam Stabilizer | Appearance of the Mixture |
|---|---|---|
| 13 | A | clear |
| 14 | B | clear |
| 15 | C | clear |
| 16 | D | clear |
| 17 | E | clear |
| 18 | F | clear |
| 19 | G | clear |
| 20 | H | almost clear |
| 21 | I | almost clear |
| 22 | Comparison 1 | very cloudy |
| 23 | Comparison 2 | very cloudy |

We claim:

1. In a method for the preparation of rigid polyurethane and/or polyisocyanurate foams from a foaming mixture comprising (1) an at least difunctional polyisocyanates, (2) a compound with at least two hydrogen atoms capable of reacting with isocyanates, the equivalent weight of which per reactive hydrogen atom is about 50 to 900, (3) a catalyst, (4) a blowing agent and (5) a foam stabilizer, devoid of silicon atoms, the improvement which comprises that the foam stabilizer is a polyoxyalkylene ether of an alkylphenol-aldehyde condensation product,
   the alkyl group(s) of the alkylphenol having 1 to 22 carbon atoms,
   the aldehyde having 1 to 18 carbon atoms,
   the condensation product comprising on the average 4 to 18 alkylphenol groups,
   the oxyalkylene units having 2 to 4 carbon atoms and
   the content of oxyalkylene groups being 15 to 85% by weight, based on the total weight.

2. The improvement of claim 1, wherein at least a portion of the terminal OH groups of the polyoxyalkylene moiety is replaced by groups, which are inert towards isocyanate groups.

3. The improvement of claim 2, wherein the polyoxyalkylene moiety has a terminal $OR^1$ group and $R^1$ is alkyl with 1 to 8 carbon atoms, carbamoyl or acyl.

4. The improvement of claims 1 or 2, wherein
   the alkyl group of the alkylphenol has 8 to 12 carbon atoms,
   the aldehyde has 1 to 4 carbon atoms,
   the condensation product comprises on the average 4 to 10 alkylphenol groups,
   the oxyalkylene units have 2 or 3 carbon atoms and
   the content of oxyalkylene groups is 35 to 65% by weight, based on the total weight.

5. The improvement of claims 1 or 4, wherein the foam stabilizer is a polyoxyethylene ether of an alkylphenol-formaldehyde condensation product.

6. The improvement of claims 1 or 2, wherein the amount of said foam stabilizer in the foaming mixture is about between 0.2 to 5 percent by weight, calculated on the amount of polyol in the mixture.

7. In the method of claims 1, 4 or 5, wherein the foaming mixture additionally comprises a flame retardant and a chain extender.

8. The foam products obtained by the method of claims 1, 4 and 5.

* * * * *